United States Patent
Herbst et al.

(10) Patent No.: US 9,547,146 B2
(45) Date of Patent: Jan. 17, 2017

(54) TAMPER SENSITIVE FIBER OPTIC CABLE

(71) Applicant: AFL Telecommunications LLC, Duncan, SC (US)

(72) Inventors: Brian Herbst, Easley, SC (US); Patrick E. Dobbins, Greer, SC (US); Joseph Cignarale, Greer, SC (US)

(73) Assignee: AFL Telecommunications LLC, Duncan, SC (US)

(*) Notice: Subject to any disclaimer, the term of this patent is extended or adjusted under 35 U.S.C. 154(b) by 30 days.

(21) Appl. No.: 14/412,559

(22) PCT Filed: Jul. 5, 2013

(86) PCT No.: PCT/US2013/049458
§ 371 (c)(1),
(2) Date: Jan. 2, 2015

(87) PCT Pub. No.: WO2014/008478
PCT Pub. Date: Jan. 9, 2014

(65) Prior Publication Data
US 2015/0131951 A1    May 14, 2015

Related U.S. Application Data

(60) Provisional application No. 61/668,110, filed on Jul. 5, 2012.

(51) Int. Cl.
*G02B 6/44* (2006.01)
(52) U.S. Cl.
CPC .............. *G02B 6/4469* (2013.01); *G02B 6/443* (2013.01); *G02B 6/4434* (2013.01); *G02B 6/4433* (2013.01)

(58) Field of Classification Search
CPC .............................. G02B 6/443; G02B 6/4434
See application file for complete search history.

(56) References Cited

U.S. PATENT DOCUMENTS

| | | | |
|---|---|---|---|
| 4,371,234 A | 2/1983 | Parfree et al. | |
| 4,606,604 A * | 8/1986 | Soodak ............... | G02B 6/4416 385/101 |
| 6,049,647 A * | 4/2000 | Register ............... | G02B 6/4416 385/100 |
| 2004/0252954 A1* | 12/2004 | Ginocchio ............. | G02B 6/443 385/100 |
| 2007/0081773 A1* | 4/2007 | Pizzorno ............. | E21B 47/1025 385/100 |
| 2010/0079855 A1 | 4/2010 | Dong et al. | |
| 2011/0280529 A1 | 11/2011 | Herbst | |

OTHER PUBLICATIONS

International Search Report for PCT/US2013/049458 dated Dec. 16, 2013.
Written Opinion for PCT/US2013/049458 dated Dec. 16, 2013.

* cited by examiner

*Primary Examiner* — Ryan Lepisto
*Assistant Examiner* — Mary A El Shammaa
(74) *Attorney, Agent, or Firm* — Dority & Manning, P.A.

(57) ABSTRACT

A fiber optic cable including an inner guard layer surrounding a core containing at least one optical fiber; and an outer guard layer surrounding the inner guard layer; wherein the inner guard layer includes at least one metal tube with at least one optical fiber inside the tube; and wherein the outer guard layer includes at least one metal tube with at least one optical fiber inside the tube.

17 Claims, 2 Drawing Sheets

TAMPER SENSITIVE FIBER OPTIC CABLE

CROSS-REFERENCE TO RELATED APPLICATIONS

This application is based upon and claims the benefit of priority from U.S. Provisional Application No. 61/668,110, filed Jul. 5, 2012, in the United States Patent and Trademark Office, the disclosures of which are incorporated herein in its entirety by reference.

BACKGROUND

1. Field

The invention is related to a fiber optic cable, and more particularly to a highly tamper sensitive fiber optic cable.

2. Related Art and Background

When optical fiber cables came into the market, it was deemed that they were tamper proof as someone could not tap into the core of the fiber to get to the data being transferred. Unfortunately, this is no longer true. The fiber can be tapped into to obtain the data that is being transmitted through splicing in a splitter or with a device that bends the fiber enough to create some leaking of the signal from the core. With the right equipment, this leaked signal can be captured.

The need for secure communication is critical for a variety of entities ranging from the banking industry, government, military and industry. Typically the signals can be encrypted which improves the security but some risk remains as hackers are becoming more sophisticated.

Therefore, there is a need for a system that can monitor if the cable is being tampered with. There are sophisticated interrogation systems that can measure vibration on an optical fiber using coherent Rayleigh processing or inter-ferometic sensing technologies which also can measure vibration. If someone created vibration on a fiber optic cable while trying to access the fibers, these technologies would sense the event very well.

However, if no vibration or minimal vibration was created, for example, by using chemicals/acids to eat away the cable structure to get to the communication fibers, the information being transferred could possibly be compromised. Therefore, there is a need to have a cable structure that can provide additional layers of tamper resistance.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

One embodiment of the invention is a fiber optic cable with an inner guard layer surrounding a core containing at least one optical fiber; and an outer guard layer surrounding the inner guard layer; wherein the inner guard layer includes at least one metal tube with at least one optical fiber inside the tube; and wherein the outer guard layer includes at least one metal tube with at least one optical fiber inside the tube.

Other features of the embodiment include the inner guard layer including a plurality of metal tubes with at least one optical fiber inside the plurality of metal tubes and the outer guard layer includes a plurality of metal tubes with at least one optical fiber inside the plurality of metal tubes.

Other features of the embodiment include the cable including a jacket surrounding the outer guard layer.

Other features of the embodiment include the cable including a strength element in the core.

Other features of the embodiment include the inner guard layer being wrapped in a helical pattern and the outer guard layer being wrapped in a contra-helical pattern.

Other features of the embodiment include the cable including at least one of an adhesive and a polymer in spaces between at least one of the inner guard layer, the outer guard layer and the core.

Other features of the embodiment include the cable including a plurality of the metal tubes in at least one of the inner guard layer and outer guard layer being welded together.

Other features of the embodiment include the cable wherein a diameter of the inner guard layer metal tubes is different than a diameter of the outer guard layer metal tubes.

Other features of the embodiment include the cable wherein a diameter of the inner guard layer metal tubes is smaller than a diameter of the outer guard layer metal tubes.

DETAILED DESCRIPTION

The following detailed description is provided to gain a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, an exemplary embodiment will be described with reference to accompanying drawings.

Figure 1:
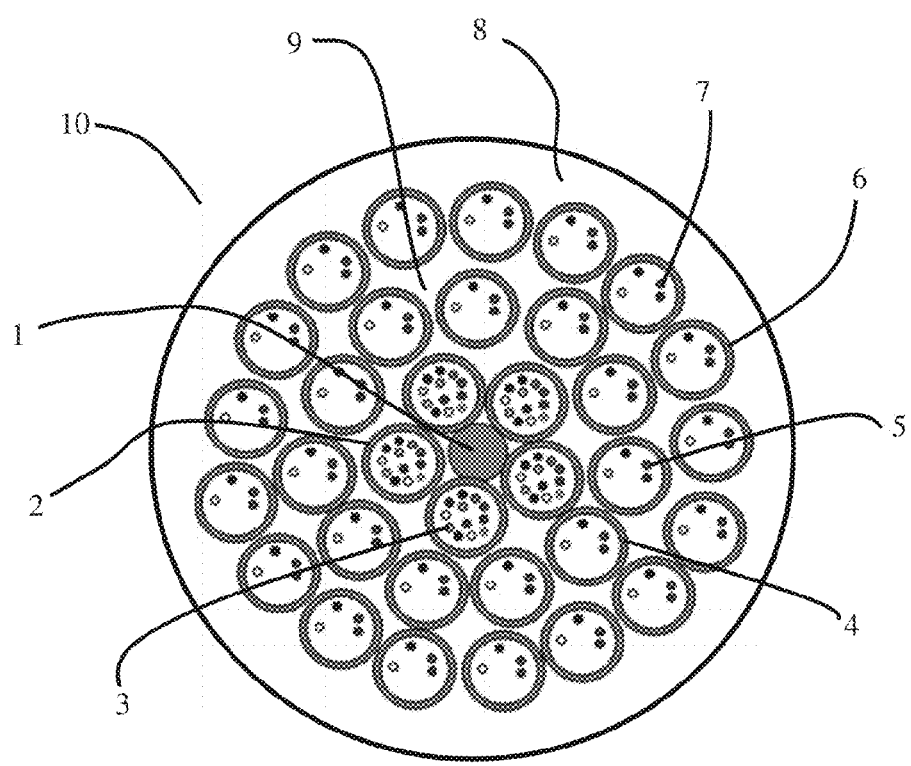
FIG. 1 is a cross-sectional view of an embodiment of a cable according to the present invention.

Referring to the drawings, FIG. 1 is a cross-sectional view of a cable 10 according to an exemplary embodiment of the invention. In this embodiment, cable 10 has the communication fibers 3 in the center of the cable. The exact core structure depends on the number of fibers being protected and may include a strength element 1 in the center. In this embodiment, the core structure includes five tubes 2 with sixteen optical fibers 3 in each tube 2. In various embodiments of the invention, the core structure could include, but not be limited to, fiber counts ranging from 1 to 3000. These optical fibers 3 would preferably be housed in a tube/structure 2 that is difficult to remove such as a stainless steel tube.

Figure 3:
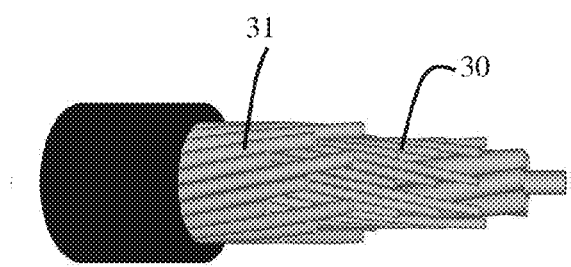
FIG. 3 is a side view of an embodiment of a cable according to the present invention.

Around the core is a layer of guard fiber elements 4 that may be wrapped in a helical pattern and over that is another layer of guard fiber elements 6 that may be wrapped contra-helically. FIG. 3 shows one possible wrapping pattern. In this figure, guard fiber elements 30 are wrapped helically and guard fiber elements 31 are wrapped contra-helically. The embodiment is not limited to two guard layers, and more could be added for improved tamper resistance. These guard fiber elements 4, 6 would house optical fibers 5, 7 and these would be interconnected and monitored optically by commonly known methods with the intent of looking for optical loss and/or acoustic/vibration signature. The intent is that if someone wanted to access the guard fibers 5, 7, they would have extreme difficulty getting through the two layers of guard elements 4, 6 without creating either optical loss or an acoustic/vibration signal.

These guard elements would preferably be housed in a tube/structure 4, 6 that is difficult to remove such as a stainless steel tube.

The outside of the cable could be covered by a jacket 8, made of known conventional cable jacket materials, including, but not limited to, polyethylene.

In another embodiment, additional layers of polymers and adhesives between the layers, such as in spaces 9, can be added can make access to the communication fibers 3 increasingly difficult.

In another embodiment, if metal tubes are used, the tubes may be spot welded together so they are not "un-stranded" easily.

In another embodiment, if metal elements are used, an electric current can be driven through the structure and the current may be monitored. Thus, if part of the metal structure is removed/cut, the signal will be disrupted, which would indicate possible tampering. Also, if metal elements are used, the resistance of the structure may be measured. Thus, if part of the metal structure is removed/cut, the resistance will change, which would indicate possible tampering.

In another embodiment, the user may deploy decoy communication fibers in the core as well—i.e. using 432 fibers when they only need 48 fibers. They would transmit false data down the other fibers. Ideally the sequence would be adjusted randomly as well to create further difficulty to the entity trying to get into the key communication fibers.

In another embodiment, polymer materials could be used to create a bond with the metal elements in the core. This both makes it more difficult to separate the elements and to identify the stainless tubes versus the wires.

In another embodiment, decoy guard elements of stainless steel tube and/or thin walled polybutylene terephthalate (PBT) may be added to complicate the attempts to enter the cable.

While the embodiment shown in FIG. 1 shows five tubes in the core, more or less tubes could be used depending on the size of the cable. Similarly, while eleven inner guard elements 4 are shown, more or less elements could be used depending on the size of the cable. Similarly, while seventeen outer inner guard elements 6 are shown, more or less elements could be used depending on the size of the cable. Likewise, while FIG. 1 shows that the inner guard elements 4 and outer guard elements 6 as having the same diameter, they could have different diameters, for example the diameter of the outer guard elements 6 could be larger than the diameter of the inner guard elements 4.

While the embodiment shown in FIG. 1 shows fibers in each of the guard elements 4, 6, some of the guard elements can be left empty, be replaced with a filler component, rather than fibers, to reduce cost, or be made of a solid material/wire. However, to the outside, they would look just like the guard elements with fibers.

In one preferred embodiment, the cable has a total of 492 fibers, which includes 72 fibers in each of six core tubes, which may be used for communications, and sixty guard fibers spread out in the inner and outer guard layers.

Figure 2:
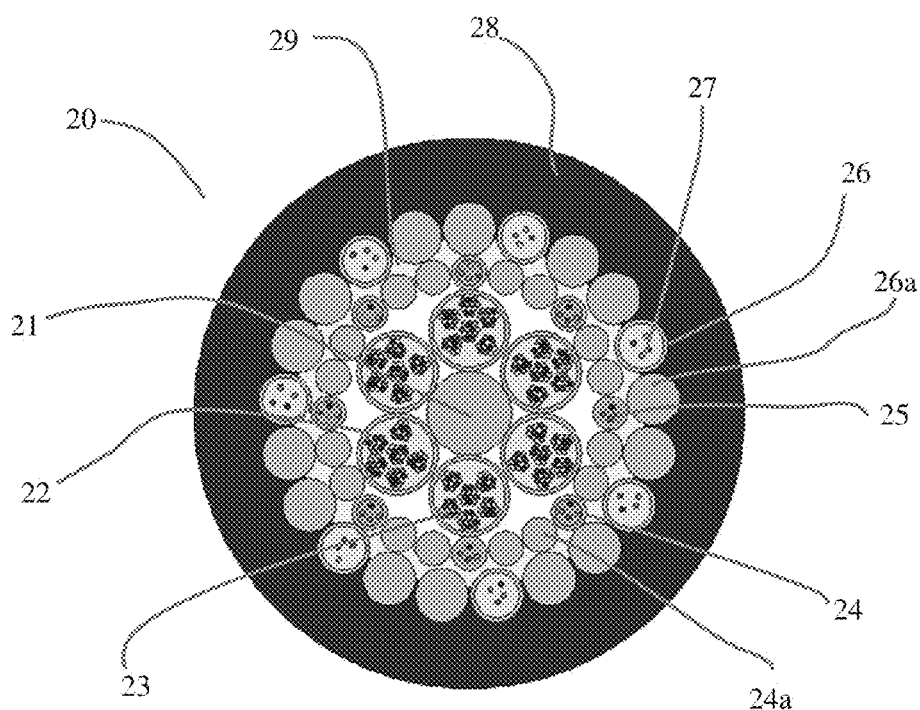
FIG. 2 is a cross-sectional view of another embodiment of a cable according to the present invention.

Referring to the drawings, FIG. 2 is a cross-sectional view of a cable 20 according to another exemplary embodiment of the invention. This cable has a total of 492 fibers, which includes 72 fibers in each of six core tubes, which may be used for communications, and sixty guard fibers spread out in the inner and outer guard layers. In this embodiment, cable 20 has the communication fibers 23 in the center of the cable. The exact core structure depends on the number of fibers being protected and may include a strength element 21 in the center. In this embodiment, the core structure includes six tubes 22 with 72 optical fibers 23 in each tube 22. However, the core structure of this embodiment is not limited to these fiber counts. These optical fibers 23 would preferably be housed in a tube/structure 22 that is difficult to remove such as a stainless steel tube.

Around the core is a layer of guard fiber elements 24 that may be wrapped in a helical pattern and over that is another layer of guard fiber elements 26 that may be wrapped contra-helically. See, for example. The embodiment is not limited to two guard layers, and more could be added for improved tamper resistance. These guard fiber elements 24, 26 would house optical fibers 25, 27 and these would be interconnected and monitored optically by commonly known methods with the intent of looking for optical loss and/or acoustic/vibration signature. The intent is that if someone wanted to access the guard fibers 25, 27, they would have extreme difficulty getting through the two layers of guard elements 24, 26 without creating either optical loss or an acoustic/vibration signal.

These guard elements would preferably be housed in a tube/structure 24, 26 that is difficult to remove such as a stainless steel tube. In this embodiment, decoy guard elements of stainless steel tube and/or thin walled polybutylene terephthalate (PBT) or solid materials/wires 24a, 26a may be added to complicate the attempts to enter the cable.

The outside of the cable could be covered by a jacket 28, made of known conventional cable jacket materials, including, but not limited to, polyethylene.

In another embodiment, additional layers of polymers and adhesives between the layers, such as in spaces 29, can be added can make access to the communication fibers 23 increasingly difficult.

In another embodiment, if metal tubes are used, the tubes may be spot welded together so they are not "un-stranded" easily.

In another embodiment, if metal elements are used, an electric current can be driven through the structure and the current may be monitored. Thus, if part of the metal structure is removed/cut, the signal will be disrupted, which would indicate possible tampering. Also, if metal elements are used, the resistance of the structure may be measured. Thus, if part of the metal structure is removed/cut, the resistance will change, which would indicate possible tampering.

In another embodiment, the user may deploy decoy communication fibers in the core as well—i.e. using 432 fibers when they only need 48 fibers. They would transmit false data down the other fibers. Ideally the sequence would be adjusted randomly as well to create further difficulty to the entity trying to get into the key communication fibers.

In another embodiment, polymer materials could be used to create a bond with the metal elements in the core. This both makes it more difficult to separate the elements and to identify the stainless tubes versus the wires.

While the embodiment shown in FIG. 2 shows six tubes in the core, more or less tubes could be used depending on the size of the cable. Similarly, while 24 inner guard elements 24, 24a are shown, more or less elements could be used depending on the size of the cable. Similarly, while 21 outer inner guard elements 26, 26a are shown, more or less elements could be used depending on the size of the cable.

Likewise, while FIG. 2 shows that the inner guard elements 24, 24a and outer guard elements 26, 26a as having the different diameters, they could have the same diameters.

While the embodiment shown in FIG. 2 shows fibers in only some of the guard elements 24, 26, all of the guard elements could have fibers.

As mentioned above, although the exemplary embodiments described above are various fiber optic cables, they are merely exemplary and the general inventive concept should not be limited thereto, and it could also apply to other types of cables.

What is claimed is:

1. A fiber optic cable, comprising:
   a core containing at least one optical fiber;
   an inner guard layer surrounding the core, wherein said inner guard layer comprises a plurality of metal tubes with at least one optical fiber inside said plurality of first metal tubes, the plurality of metal tubes wrapped around the core; and
   an outer guard layer surrounding the inner guard layer, wherein said outer guard layer comprises a plurality of metal tubes with at least one optical fiber inside said plurality of metal tubes, the plurality metal tubes of the outer guard layer wrapped around the plurality of metal tubes of the inner guard layer,
   wherein said inner guard layer is wrapped in a helical pattern.

2. The cable of claim 1, further comprising a jacket surrounding said outer guard layer.

3. The cable of claim 1, further comprising a strength element in said core.

4. The cable of claim 1, wherein said outer guard layer is wrapped in a contra-helical pattern.

5. The cable of claim 1, further comprising at least one of an adhesive and a polymer in spaces between at least one of said inner guard layer, said outer guard layer and said core.

6. The cable of claim 1, wherein a plurality of said metal tubes in at least one of said inner guard layer and outer guard layer are welded together.

7. The cable of claim 1, wherein a diameter of said inner guard layer metal tubes is different than a diameter of said outer guard layer metal tubes.

8. The cable of claim 7, wherein a diameter of said inner guard layer metal tubes is smaller than a diameter of said outer guard layer metal tubes.

9. The cable of claim 1, wherein the at least one optical fiber of the inner guard layer and the at least one optical fiber of the outer guard layer are configured to detect at least one of the optical loss, acoustic, and vibration signature.

10. A fiber optic cable, comprising:
    a core containing at least one optical fiber;
    an inner guard layer surrounding the core, wherein said inner guard layer comprises a plurality of first strand members helically wound in a first direction, each of the first strand members including a metal tube or wire, and at least one of the first strand members including at least one optical fiber inside a first metal tube, the plurality of first strand members wrapped around the core; and
    an outer guard layer surrounding the inner guard layer, wherein said outer guard layer comprises a plurality of second strand members helically wound in a second direction opposite to the first direction, each of the second strand members including a metal tube or wire, and at least one of the second strand members including at least one optical fiber inside a second metal tube, the plurality of second strand members wrapped around the plurality of first strand members.

11. The cable of claim 10, further comprising a jacket surrounding said outer guard layer.

12. The cable of claim 10, further comprising a strength element in said core.

13. The cable of claim 10, further comprising at least one of an adhesive and a polymer in spaces between at least one of said inner guard layer, said outer guard layer and said core.

14. The cable of claim 10, wherein at least one first strand member and at least one second strand member are welded together.

15. The cable of claim 10, wherein a diameter of said inner guard layer first strand members is different than a diameter of said outer guard layer second strand members.

16. The cable of claim 15, wherein a diameter of said inner guard layer first strand members is smaller than a diameter of said outer guard layer second strand members.

17. The cable of claim 10, wherein the at least one optical fiber of the inner guard layer and the at least one optical fiber of the outer guard layer are configured to detect at least one of the optical loss, acoustic, and vibration signature.

* * * * *